United States Patent [19]

Johnson

[11] Patent Number: 4,684,796
[45] Date of Patent: Aug. 4, 1987

[54] COMMON OPTICAL APERTURE LASER SEPARATOR FOR RECIPROCAL PATH OPTICAL

[75] Inventor: William M. Johnson, Sudbury, Mass.

[73] Assignee: The Charles Stark Draper Laboratory, Inc., Cambridge, Mass.

[21] Appl. No.: 512,153

[22] Filed: Jul. 8, 1983

[51] Int. Cl.[4] .......................... G01C 3/08; G02B 26/08
[52] U.S. Cl. .................................. 250/201; 350/274; 356/4; 356/5
[58] Field of Search ................ 250/201; 350/171, 172, 350/486, 487, 273, 274; 356/4, 152, 153, 5

[56] References Cited

U.S. PATENT DOCUMENTS

| | | |
|---|---|---|
| 3,637,312 | 1/1972 | Cantor et al. |
| 3,659,613 | 5/1972 | Bredemeier |
| 3,695,767 | 10/1972 | George et al. |
| 3,762,819 | 10/1973 | Myer |
| 3,909,116 | 9/1975 | Kohashi |
| 3,966,327 | 6/1976 | Hanson |
| 4,091,274 | 5/1978 | Angelbeck et al. ................ 250/201 |
| 4,146,329 | 3/1979 | King et al. |
| 4,197,006 | 4/1980 | Maillet .................................. 356/5 |
| 4,209,253 | 6/1980 | Hughes |
| 4,252,439 | 2/1981 | Drozella |
| 4,281,896 | 8/1981 | Coccoli |
| 4,290,670 | 9/1981 | Gerber ................................ 350/274 |
| 4,302,796 | 11/1981 | Gustavson et al. |
| 4,319,839 | 3/1982 | Durran |
| 4,326,800 | 4/1982 | Fitts |
| 4,329,033 | 5/1982 | Masunaga et al. ................ 250/201 |
| 4,384,198 | 5/1983 | Williamson |
| 4,467,186 | 8/1984 | Goralnick et al. ................ 250/201 |

Primary Examiner—Edward P. Westin
Attorney, Agent, or Firm—Weingarten, Schurgin, Gagnebin & Hayes

[57] ABSTRACT

A laser separator defining an optical aperture is provided for transmitting outgoing high-energy laser pulses along an optical path through the optical aperture toward a targeted object, and for receiving return energy present along the same, but reciprocal, optical path and incident on the same optical aperture. The common optical aperture laser separator for reciprocal path optical systems includes a rotatable metallic disc having openings therethrough, and a highly polished substantially planar reflecting surface. The rotatable disc is so positioned in the reciprocal optical path that its normal is at a predetermined non-zero acute angle thereto. Each pulse of outgoing, high-energy laser energy passes unimpeded through the optical aperture and through the corresponding one of the openings onto a targeted object. A sensor receives the return optical energy present along the same, but reciprocal, optical path and incident on the optical aperture during the interpulse intervals. A controller and cooperative optics are operative in response to the sensor signals are provided for adapting the pointing direction and beam pattern characteristics of subsequent outgoing high-energy laser pulses for maintaining each of them on-target and in-focus. The system has application in laser welding, cutting, and melting, laser communications and surveillance, and laser pointing and tracking systems, among others.

21 Claims, 5 Drawing Figures

COMMON OPTICAL APERTURE LASER SEPARATOR FOR RECIPROCAL PATH OPTICAL

CROSS REFERENCE TO RELATED APPLICATIONS

This invention is related to copending applications Ser. No. 512,150 and Ser. No. 516,468 both entitled "Common Optical Aperture Laser Boresighter For Reciprocal Path Optical Systems" by William M. Johnson, and by William M. Johnson and Kenneth Smith, respectively, both filed on even date herewith.

FIELD OF THE INVENTION

This invention is directed to the field of optics, and more particularly, to a novel common optical aperture laser separator for reciprocal path optical systems.

BACKGROUND OF THE INVENTION

In many adaptive optical systems, such as applications including laser pointing, tracking, welding, cutting, and melting, and laser communications and surveillance, among others, the direction, focal pattern, and other optical characteristics of directed, outgoing, high-energy laser light is controlled in response to incoming, return optical energy reflected from a targeted object. Attenuation, blooming, turbulence, and other phenomena induced by the propagation medium, however, distort and otherwise disturb both the outgoing and the return beams. To overcome the effects of such medium-induced phenomenon and point at a moving target, it is desirable to direct the outgoing optical energy toward the targeted object, and to receive the incoming return optical energy back therefrom, along a common, reciprocal, optical path. the outgoing optical energy and the return optical energy thereby undergo substantially self-cancelling medium-induced propagation distortions.

Coccoli, U.S. Pat. No. 4,281,896, incorporated herein by reference, provides a laser separator in which outgoing and return optical energy are separated along such a reciprocal optical path by an array of selectively inclined and spaced-apart planar mirrors. However, diffraction effects along its narrow dimension in many instances result in less than desirable levels of on-target optical energy and beam distortion, among other things.

It is also known to provide a laser separator in which the outgoing and the return optical energy are separated along a reciprocal optical path by a grating that is buried below the reflecting surface of a wavelength-selective mirror. The mirror is reflective at the wavelength of the outgoing optical energy, and it is transmissive to the return optical energy at another, different wavelength. The grating is responsive to the wavelength of the return optical energy and reflects it off at a predetermined angle, other than that predicated by Snells' law, onto a sensor. However, this type of reciprocal path laser separator not only tends to melt and otherwise disintegrate with high energy levels, but also its optical performance tends to significantly degrade with the presence of dirt, dust, and other such contaminants on the surface of the wavelength-selective mirror. In addition, the different wavelengths for the outgoing and the return optical signals require the provision of comparatively costly and complex electronic detection circuitry.

SUMMARY OF THE INVENTION

The optical system of the present invention provides means defining a common optical aperture that is capable of separating very high energy outgoing and return optical signals along a reciprocal optical path without undesirable diffraction effects, without degradation of optical elements, and without requiring different wavelengths, among other advantages. The novel common optical aperture laser separator for reciprocal path optical systems of the present invention contemplates a laser source for time-sequentially providing pulses of high energy coherent light in a first direction defining an optical path onto a targeted object, and means defining a common optical aperture positioned along the optical path for transmitting the pulses of high energy coherent light directly through the common optical aperture unimpeded toward the targeted object, and for deviating return optical energy present along the same optical path and incident upon the common optical aperture during the interpulse intevals onto a sensor. In preferred embodiment, the common optical aperture defining means include a rotatable disc having a highly polished substantially planar reflective surface that is positioned in the reciprocal optical path such that its reflective surface confronts the targeted object, with the normal to its planar surface at a preselected non-zero acute angle to the optical path. The disc includes at least two bores therethrough having cylindrical walls, where the longitudinal axis of each of which intersects the normal to the planar surface of the disc at the same preselected non-zero acute angle. Means coupled to the rotatable disc and to the high-energy laser source are operative to pulse the laser in time synchronization with the alignment of each of the cylindrical bores with the optical path. Means are provided for sensing the optical energy present along the reciprocal optical path during the interpulse intervals. Means are provided for adapting the pointing direction and the optical characteristics of the subsequent outgoing high energy laser pulses in accordance with the optical characteristics of the return energy received back along the reciprocal optical path.

BRIEF DESCRIPTION OF THE DRAWINGS

Other advantages and features of the present invention will become apparent as the invention becomes better understood by referring to the following exemplary and non-limiting detailed description of the preferred embodiments, and to the drawings, wherein.

DETAILED DESCRIPTION OF THE PREFERRED EMBODIMENTS

Figure 1:
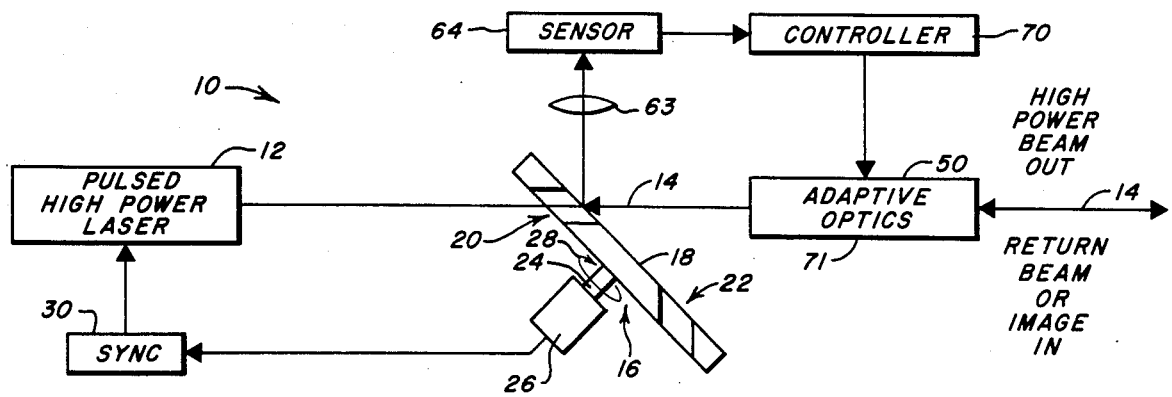
FIG. 1 is a block diagram illustrating a common optical aperture laser separator for reciprocal path optical systems according to the present invention.

Referring now to FIG. 1, generally designated at 10 is a novel common optical aperture laser separator for reciprocal path optical systems according to the present ivention. The system 10 includes a source 12 for providing pulses of coherent, high-energy, laser light. The propagation path of the pulses defines an optical path 14. A rotatable disc generally designated 16 having a highly polished substantially planar reflecting surface 18 is provided along the common optical path 14, with the normal to the planar surface 18 of the disc 16 intersecting the optical path 14 at a preselected non-zero acute angle. The disc defines a common optical aperture at the intersection of a region thereof with the path 14 that is operative in a manner to be described to separate outgoing laser light and return images reciprocally along the optical path 14.

The disc 16 has a first opening generally designated 20 therethrough, and a second opening generally designated 22 therethrough. The openings 20, 22 preferably are cylindrical bores that are symmetrically disposed about the center of the disc 16, respectively intermediate the center and a corresponding one of the ends of a disc diagonal, with the long axis of the cylindrical wall of each of the bores 20, 22 intersecting the normal to the planar mirror surface 18 at the same preselected non-zero acute angle. It will be appreciated that any other suitable openings such as rectangular bores and sector or other shaped cutouts can be employed as well without departing from the inventive concept. It will also be appreciated that although two openings are specifically illustrated, a different number may be employed as well.

Figure 2:
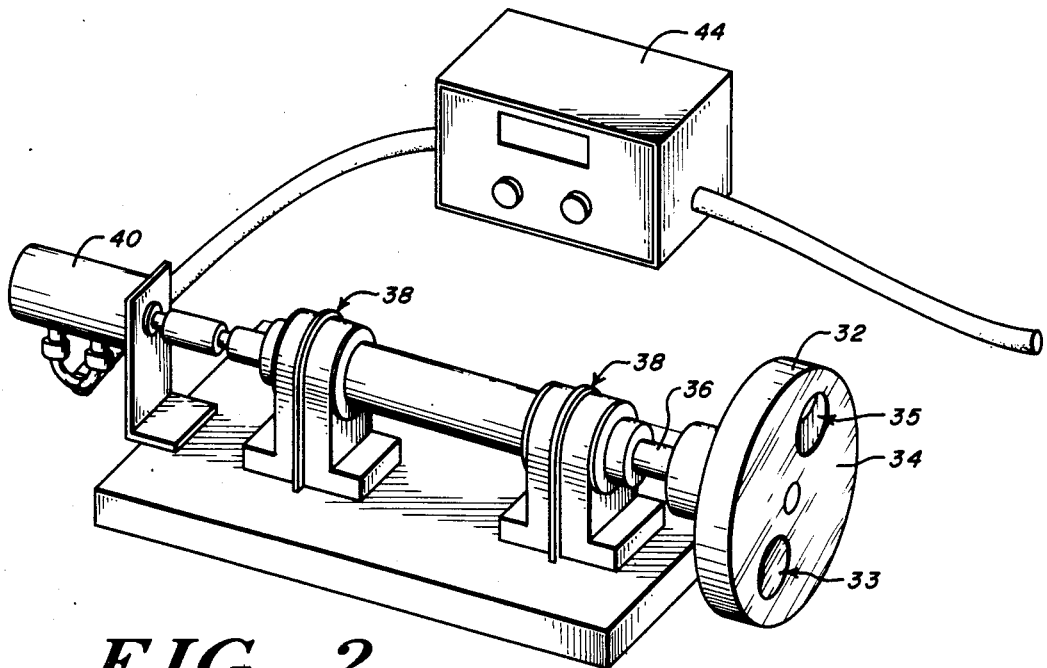
FIG. 2 is an isometric view illustrating a preferred embodiment of the rotatable disc of FIG. 1.

The disc 16 is mounted by a shaft 24 to a motor 26 for angular rotation designated by an arrow 28. A synchronizer 30, coupled to the disc 16 and to the high power laser 12, is operative is response to the absolute angular position of the disc 16 to pulse the laser source 12 in time synchronization with the alignment of corresponding ones of the cylindrical bores 20, 22 along the common optical path 14. At such time when individual ones of the bores 20, 22 are in alignment with the common optical path 14, the long axis of its cylindrical wall is generally co-linear with the optical path 14. Coherent light produced by the source 12 at such times passes unimpeded through the optical aperture and along the optical path 14. As shown in FIG. 2, preferably a metallic disc 32 is provided having a highly polished substantially planar surface 34 and two cylindrical spaced-apart bores generally designated 33, 35 therethrough. The bores 33, 35 are positioned symmetrically one to each side of the center point of the disc 32 respectively intermediate the ends of a diagonal thereof. The metallic disc 32 is centrally fastened to a shaft 36 that is journaled on mechanical or air bearings generally designated 38. A motor 40, driven by a controller 44, is connected to the shaft 36.

Figure 3:
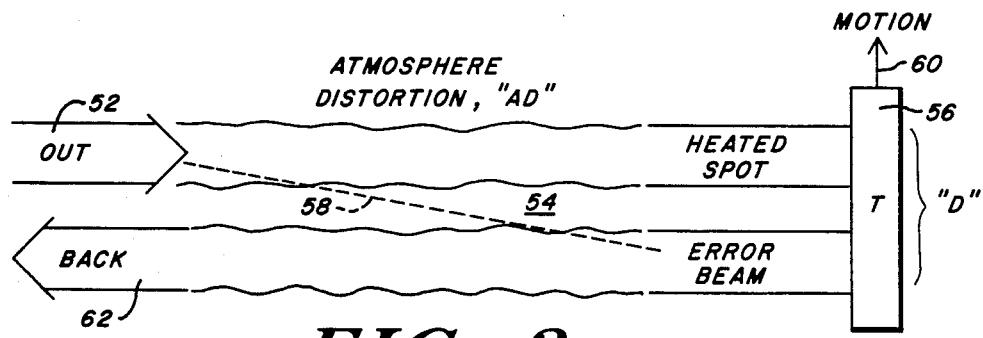
FIG. 3 is a pictorial diagram illustrating atmospheric distortion and target motion in a common optical aperture laser separator for reciprocal path optical systems according to the present invention.

Returning now to FIG. 1, optics 50 are positioned in the optical path 14. Optics 50 usually includes a beam expander/compressor and associated relay mirrors, not shown. Outgoing pulses of high-energy laser light pass through the optics 50 and are incident upon a targeted object, not shown to the right of the figure, on-target and in-focus. As illustrated in FIG. 3, each pulse of outgoing high-energy laser light 52 propagates through a propagaton medium generally designated 54, such as the atmosphere, and is incident upon, and thermally excites, a small localized region of a targeted object 56 designated "T". As schematically shown by a dashed line 58, the outgoing beam undergoes deviations in its intended optical path occassioned by such medium phenomena as blooming, turbulence, and the like, designated "AD", and by the motion 60 designated "D" of the targeted object. A return beam 62, shown displaced from the beam 52 for clarity of illustration, is reflected back off the targeted object 56, traverses the reciprocal optical path back to the common optical aperture of the disc 16, and undergoes substantially self-cancelling medium induced distortions. As appears more fully below, a laser tracking and pointing system can be employed to adapt the pointing direction to compensate for both atmospheric distortion and target motion.

Figure 4:
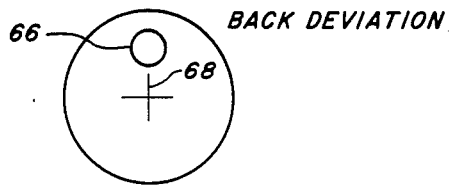
FIG. 4 is a schematic diagram illustrating the operation of a sensor of the common optical aperture laser separator for reciprocal path optical systems acording to the present invention.

Returning again to FIG. 1, during the interpulse interval of the pulses provided by the high-energy laser 12, the bores 20, 22 of the disc 16 are rotated to angular positions, not illustrated, where they are not in alignment with the optical path 14. The energy present along the common optical path 14 in the return beam 62 (FIG. 3) during the interpulse intervals is focussed by the optics 50 into the common optical aperture defined by the intersection of the region of the mirror 18 and the reciprocal optical path 14, and is reflected thereof in accordance with Snells' law onto an imaging lens 63. A sensor 64, preferably a quadrant cell or a mosaic detector array, is positioned to receive the imaged return beam reflected off the optical aperture. As shown in FIG. 4, generally shown at 66 is an image of the return beam 62 (FIG. 3) on the sensor 64 (FIG. 1). The centroid of the energy of the return image 66 relative to a null reference position 68 provides information representative of the angular misalignment of the outgoing and the return energy, and the size of the return image 66 provides information representative of the focal pattern of on-target energy. The output of the sensor is applied to a centroid processor 70 to adapt optics 50 in accordance with the particular applications environment to control the optical characteristics of subsequent outgoing pulses of high energy laser light.

Figure 5:
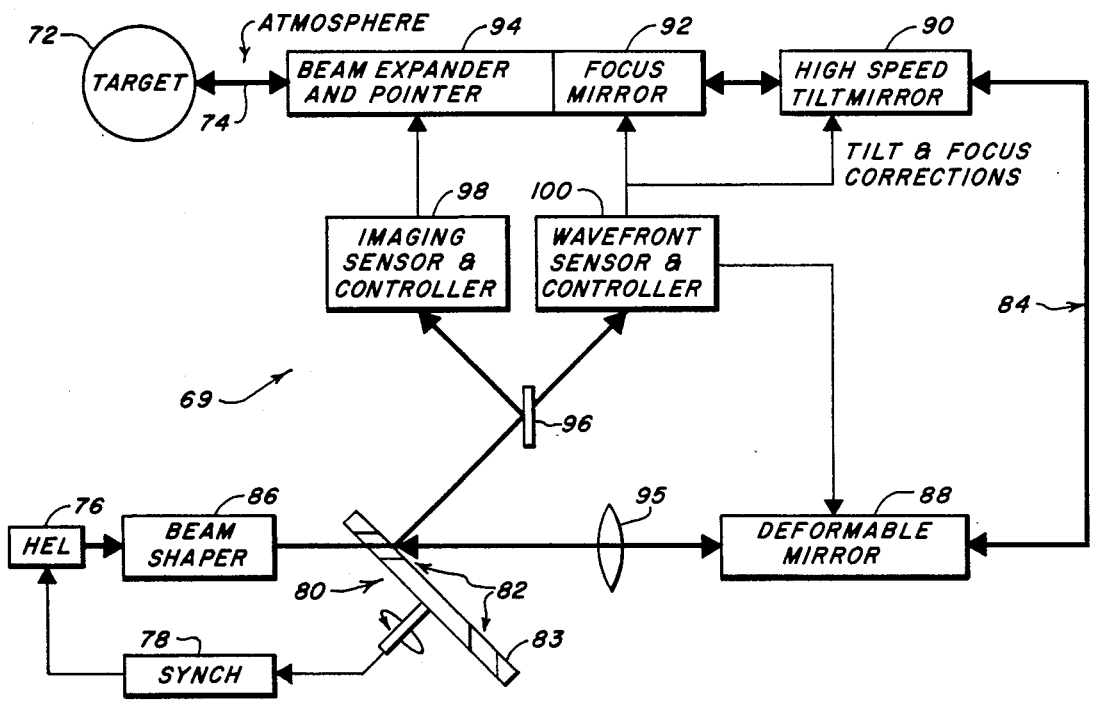
FIG. 5 is a block diagram of an embodiment of an adaptive laser pointing and tracking system embodying the common optical aperture laser separator for reciprocal path optical systems according to the present invention.

Referring now to FIG. 5, generally shown at 69 is an embodiment of an adaptive laser tracking and pointing system embodying the common optical aperture laser separator for reciprocal path optical systems of the present invention. The system 69 is operative to repetitively pulse a remote target 72 with a time sequence of high-energy laser bursts through an atmospheric propagation medium 74, and during the interpulse intervals is operative in response to reflected return energy back from the target over the same, but reciprocal, optical path to adapt in real-time the optical characteristics of subsequent outgoing high-energy pulses to maintain each such pulse on-target and in-focus.

The system 69 includes a high-energy laser 76 that is coupled to a synchronizer 78. The synchronizer 78 is coupled to a spinning metallic disc generally designated 80. The disc 80 has cylindrical bores generally designated 82 and a highly polished substantially planar reflecting surface 83, as described above in connection with FIGS. 1 and 2. The synchronizer 78 is operative in response to the absolute angular position of the disc 80 to pulse the high-energy laser 76 in time synchronization with the alignment of individual ones of the bores 80 with the path of the outgoing laser pulses.

Each outgoing high-energy pulse traverses an optical path generally designated 84, wherealong it is shaped in a beam shaper 86. Each shaped pulse passes unimpeded through the corresponding ones of the bores 82 provided in the disc 80, and its phase front is controllably varied by a deformable mirror 88. The mirror 88 preferably is a rubber mirror known to those skilled in the art. Each pulse is selectively inclined in azimuth and elevation by a high-speed tilt mirror 90, is selectively ranged by a focus mirror 92, and is passed through a beam expander and pointer 94 toward the remote target 72 through the atmosphere 74.

During the interpulse intervals, return energy is reflected back from the target along the same, but reciprocal, optical path 74, is incident on the reflecting surface of the common optical aperture defined by the intersection of the optical path and the reflective surface of the spinning mirror 80 by an imaging lens 95, and is reflected therefrom to a beam splitter 96. The beam splitter 96 splits a portion of the return energy incident on the common optical aperture to an imaging sensor and controller 98, and the remaining portion thereof is split to a wavefront sensor and controller 100. The sensor and controller 98 is operative in response to the return energy as described above in connection with FIG. 4 to provide signals to the beam expander 94, preferably implemented as controllably spaceable, spaced-apart mirrors, to maintain subsequent high-energy bursts focussed on-target. The wavefront sensor and controller 100 is operative in response to the shape of the return energy to provide signals to the focussing mirror 92 to adapt the range of subsequent outgoing energy, to provide control signals to the high-speed tilt mirror 90 to correct the azimuth and the elevation of the outgoing energy, and to provide control signals to the deformable mirror 88 to correct for coma, astigmatism, and other asymmetrical distortions of the subsequent outgoing high-energy bursts.

It will be appreciated that many modifications of the presently disclosed invention will become apparent to those skilled in the art without departing from the scope of the appended claims.

What is claimed is:

1. A laser separator for separating high-energy pulses of outgoing generally parallel, substantially collimated rays of laser light along a first optical path from return generally parallel, substantially collimated rays of incoming energy present along the same, but a reciprocal, second optical path during the interpulse intervals, comprising:
    transmit means positionable along said first optical path and defining an optical aperture in the neighborhood of the intersection of the transmit means with the first optical path for passing the pulses of high-energy outgoing laser light unimpeded through said optical aperture and along said first optical path; and
    planar receiving means positionable along said first optical path and defining an optical aperture in the neighborhood of the intersection of the receiving means with the first optical path that is common to and substantially identical with the optical aperture defined by the transmit means for deviating during the interpulse intervals that return incoming energy present along the second optical path that is the same, but reciprocal to, the first optical path and incident upon said common optical aperture into a third optical path defined at a predetermined non-zero angle to said first optical path in such a way that the return energy deviated along the third optical path by said optical aperture of said planar receiving means is constituted by generally parallel rays collimated after having been deviated by said planar receiving means.

2. The invention of claim 1, wherein said transmit means includes a rotatable generally flat disc having at least two openings therethrough which the pulses of high-energy outgoing laser light pass through.

3. The invention of claim 2, wherein said receiving means includes a highly polished substantially planar reflective surface adjacent said openings.

4. The invention of claim 3, wherein said openings are bores having cylindrical walls, and wherein the long axis of said cylindrical walls intersect the normal to said planar reflecting surface at said predetermined non-zero angle.

5. The invention of claim 3, wherein said rotatable disc is positioned along the first optical path such that the normal to the planar reflecting surface thereof intersects the first optical path at said predetermined non-zero angle.

6. The invention of claim 2, wherein said openings are symmetrically provided at points spaced-apart along a diagonal of the disc.

7. The invention of claim 2, further including a motor-driven shaft connected to the disc and journaled on bearings.

8. The invention of claim 2, wherein a high-energy laser is operative to provide the pulses of high-energy outgoing laser light, and further including a synchronizer coupled to the high-energy laser and to the rotatable disc for pulsing the high-energy laser at times synchronous with the alignment of individual ones of said openings along the first optical path.

9. The invention of claim 5, further including a sensor positioned along the third optical path.

10. The invention of claim 9, wherein said sensor is an imaging sensor and controller, and further including a beam expander and pointer connected to the imaging sensor and controller for prefocussing the outgoing energy.

11. The invention of claim 9, wherein said sensor includes a wavefront sensor and controller, and further including a focus mirror coupled to the wavefront sensor and controller for controlling the range of the outgoing pulses of high-energy laser light.

12. The invention of claim 9, wherein the sensor includes a wavefront sensor and controller, and further including a high-speed tilt mirror connected to the wavefront sensor and controller for controlling the azimuth and the elevation of the outgoing high-energy laser pulses.

13. The invention of claim 9, wherein said sensor includes a wavefront sensor and controller, and further including a deformable mirror coupled to the wavefront sensor and controller for controlling the outgoing high-energy laser pulses in regard to coma, astigmatism, and other asymmetrical distortions.

14. A common optical aperture laser separator for reciprocal path optical systems, comprising:
    a laser source for time sequentially providing pulses of high-energy coherent substantially collimated and generally parallel rays of light in a first direction defining a first optical path; and
    means having a planar specular surface and positioned along the first optical path defining an optical aperture in the region of the intersection thereof with the first optical path for transmitting the pulses of high-energy coherent light unimpeded directly through the optical aperture, and for deviating off of said planar specular surface during the interpulse intervals return substantially collimated and generally parallel rays of optical energy present along a second optical path that is the same as but reciprocal to the first optical path and incident on the optical aperture into a second direction different from said first direction in such a way that the substantially collimated and generally parallel rays of the return optical energy remains collimated after having been deviated by said planar surface.

15. The invention of claim 14, wherein said means includes a rotatable disc having bores therethrough through which the pulses are directly and unimpededly transmitted, and further includes a synchronizer coupled to the rotatable disc and to the laser for pulsing the laser source in time synchronization with the alignment of corresponding ones of said bores and said first optical path.

16. The invention of claim 15, further including a sensor positioned along said second direction operative to provide a signal representative of the relative position of the return energy and an optical reference position.

17. A common optical aperture laser separator, comprising:
   a laser source for providing pulses of very high energy coherent substantially collimated and generally parallel rays of light having such selected beam characteristics as focus and range along an optical path and toward a targeted object;
   a rotatable member having a substantially planar reflective surface and an opening therethrough, and positioned at a predetermined angle in the optical path with its planar reflective surface confronting the targeted object and defining an optical aperture in that neighborhood of the rotatable member that intersects the optical path;
   means responsive to the absolute angular position of the rotatable member for pulsing the laser source in time synchronization with the alignment of the opening with the optical path the pulses of which pass directly and unimpededly through the optical aperture;
   means including a sensor responsive to substantially collimated and generally parallel rays of return energy received from the targeted object along the same but reciprocal optical path and deviated by the planar reflective surface of the rotatable member that is coincident with the optical aperture during the interpulse intervals so that the collimated and generally parallel rays of the return optical energy are generally parallel and generally collimated after having been deviated by said planar surface to provide a return signal representative of the return energy; and
   means responsive to the return signal for changing the selected beam characteristics of the pulses of high energy laser light to maintain the pulses of high energy laser light on the targeted object.

18. The invention of claim 17, wherein the rotatable member is a metallic disc, having a generally planar surface and wherein the opening is a bore having a cylindrical wall the long axis of which intersects the normal to the reflective surface at said predetermined angle.

19. The invention of claim 17, wherein the pulsing means includes a syncronizer.

20. The invention of claim 17, wherein the sensor of the the return signal providing means includes one of a quadrant cell and a mosaic array sensor.

21. The invention of claim 17, wherein the changing means includes a centroid processor.

* * * * *

UNITED STATES PATENT AND TRADEMARK OFFICE
CERTIFICATE OF CORRECTION

PATENT NO. : 4,684,796

DATED : August 4, 1987

INVENTOR(S) : William M. Johnson

It is certified that error appears in the above-identified patent and that said Letters Patent is hereby corrected as shown below:

<u>In the Title</u>: "COMMON OPTICAL APERTURE LASER SEPARATOR FOR RECIPROCAL PATH OPTICAL" should read --COMMON OPTICAL APERTURE LASER SEPARATOR FOR RECIPROCAL PATH OPTICAL SYSTEMS--

<u>In the Abstract</u>:

Line 12, "predetermined non-zero" should read --preselected non-zero--

Line 20, "are operative in response to the sensor signals are" should read --operative in response to the sensor signals are--

Column 1, line 2, "PATH OPTICAL" should read --PATH OPTICAL SYSTEMS-- line 36, "path. the" should read --path. The--

Column 2, line 22, "intevals" should read --intervals-- line 62, "acording" should read --according--

Column 3, line 7, "ivention." should read --invention.-- line 67, "propagaton" should read --propagation--

Column 4, line 4, "occassioned" should read --occasioned--

Column 6, line 6, "therethrough which" should read --therethrough through which--

UNITED STATES PATENT AND TRADEMARK OFFICE
CERTIFICATE OF CORRECTION

PATENT NO. : 4,684,796

DATED : August 4, 1987

INVENTOR(S) : William M. Johnson

It is certified that error appears in the above-identified patent and that said Letters Patent is hereby corrected as shown below:

Column 8, line 32, "syncronizer." should read --synchronizer.-- line 34, "the the return" should read --the return--

Signed and Sealed this

Fifteenth Day of November, 1988

Attest:

DONALD J. QUIGG

Attesting Officer

Commissioner of Patents and Trademarks